(12) United States Patent
Garrett

(10) Patent No.: US 11,023,800 B2
(45) Date of Patent: Jun. 1, 2021

(54) HYBRID COMPUTERIZED MOBILE TRANSACTION CARD

(71) Applicant: Peter Garrett, San Francisco, CA (US)

(72) Inventor: Peter Garrett, San Francisco, CA (US)

(73) Assignee: Edge Mobile Payments LLC, Mill Valley, CA (US)

( * ) Notice: Subject to any disclaimer, the term of this patent is extended or adjusted under 35 U.S.C. 154(b) by 0 days.

(21) Appl. No.: 16/876,015

(22) Filed: May 16, 2020

(65) Prior Publication Data

US 2020/0364529 A1    Nov. 19, 2020

Related U.S. Application Data

(60) Provisional application No. 62/849,804, filed on May 17, 2019.

(51) Int. Cl.
| G06K 19/06 | (2006.01) |
| G06K 19/077 | (2006.01) |
| G06K 19/04 | (2006.01) |
| G06Q 20/32 | (2012.01) |
| G06Q 20/34 | (2012.01) |

(52) U.S. Cl.
CPC ..... *G06K 19/07769* (2013.01); *G06K 19/042* (2013.01); *G06K 19/07707* (2013.01); *G06Q 20/325* (2013.01); *G06Q 20/3229* (2013.01); *G06Q 20/341* (2013.01); *G06Q 20/3572* (2013.01)

(58) Field of Classification Search
CPC .......... G06K 19/07769; G06K 19/042; G06K 19/07707
USPC .................................. 235/492, 380
See application file for complete search history.

(56) References Cited

U.S. PATENT DOCUMENTS

| 2014/0244495 A1* | 8/2014 | Davis | G06Q 20/227 |
| | | | 705/41 |
| 2014/0339315 A1* | 11/2014 | Ko | G06Q 20/3227 |
| | | | 235/492 |
| 2016/0283934 A1* | 9/2016 | Cheng | G06Q 20/3224 |
| 2019/0286805 A1* | 9/2019 | Law | G06F 21/34 |
| 2020/0082380 A1* | 3/2020 | Zarakas | G06K 19/07733 |

* cited by examiner

*Primary Examiner* — Ahshik Kim
(74) *Attorney, Agent, or Firm* — Lamon Patent Services; Cynthia S. Lamon

(57) ABSTRACT

A computerized transaction card is provided and includes a plastic form factor resembling a credit card, the form factor including all or a combination of a magnetic stripe, a euro-pay master card and visa (EMV) chip, and or a near field communication (NFC) chip, a micro-controller powered by a rechargeable battery, at least one wireless chip set for sending and receiving data over a local wireless network; and, an interactive display screen for displaying information to a card operator.

5 Claims, 4 Drawing Sheets

HYBRID COMPUTERIZED MOBILE TRANSACTION CARD

CROSS-REFERENCE TO RELATED DOCUMENTS

The present specification claims priority to a U.S. provisional patent application Ser. No. 62/849,804 entitled "Hybrid Static Contact Smartcard and Dynamic Contactless Smartcard (Hybrid Smartcard)" filed on May 17, 2019, disclosure of which is included herein at least be reference.

BACKGROUND OF THE INVENTION

1. Field of the Invention

The present invention is in the field of financial transacting and pertains particularly to methods and apparatus combining access to multiple debit and or credit accounts from a single computerized transaction device.

2. Discussion of the State of the Art

Payment cards are part of a payment system used by financial institutions like banks, for example, to enable cardholders to access funds held in designated bank accounts or credit accounts. The cardholder may make payments by electronic funds transfer (EFT) and access automated teller machines (ATMs). There are several types of payment cards in the art, perhaps the most common classes being credit cards and debit cards.

A more recent type of payment card existing in the art is generally termed a smart card in the art. Smart cards are payment cards that contain a unique card number and some security information such as an expiration date or card verification value (CVV) and a magnetic strip and an embedded euro-pay master card and visa (EMV) chip (secure element) enabling various machines (transaction point terminals) to read and access information from the card.

More recently, smart cards have been adapted as mobile dynamic smart transaction cards. A dynamic smart card may have multiple payment card data dynamically loaded onto the single form factor of the card. A user may add any or all payment card data from debit, credit, and loyalty accounts to a mobile application associated with the smart card. The user may load the data onto the smart card via Bluetooth wireless technology.

A problem exists with the approach discussed above in that at the time of this writing, bank smart cards use a rewritable (dynamic) magstripe but do not have static EMV and NFC chips. Bank policies typically do not allow smart cards to be equipped with dynamic EMV chips, especially when combined with dynamic NFC. However, dynamic NFC is allowed through mobile wallet applications like Apple Pay or Android Pay. Consumers are not rapidly adopting mobile wallet technology and use of that is on the decline.

Companies have developed a new type of mobile wallet that may be an Internet of Things (IoT) device adapted to function as a debit card associated with a bank account or ACH account. An IoT smart card has a 16-digit card number supported by major transaction networks like Master Card and Visa as do all smart cards. A user must set up a cloud wallet account via the Internet or through an application having access to the Internet. A user may then connect to their cloud wallet using the IoT smart card over wireless fidelity (Wi-Fi) or via cellular telephone.

An IoT smart card may function by proxy on behalf of other payment cards stored in the user's cloud wallet account. The user may select a payment card, using the screen on their IoT smart card. The IoT smart card may connect to a user's cellular telephone using blue tooth wireless connection technology or another wireless communications channel and may highlight stored cards in the user's cloud wallet account. Funds are drawn down in real-time from the selected payment card in the user's cloud wallet account. Funding from a selected cloud wallet account to the user's IoT smart card may be requested in real time at the merchant POS terminal.

Although the IoT card mentioned above does provide a mobile wallet experience including the ability to pay with any stored payment cards through the one IoT smart card device. The IoT smart card might include a magstripe, EMV and NFC capability. Another issue is that funding a debit transaction with a credit card in the way described above may produce double interchange fees to the user when the user selects one of their stored credit cards in their Cloud Wallet account to fund their IoT smart card transaction. Therefore, what is clearly needed is a mobile computerized smart card that eliminates the challenges described above with current art smart cards.

BRIEF SUMMARY OF THE INVENTION

According to an embodiment of the present invention, a computerized transaction card is provided and includes a plastic form factor resembling a credit card, the form factor including all or a combination of a magnetic stripe, a euro-pay master card and visa (EMV) chip, and or a near field communication (NFC) chip, a micro-controller powered by a rechargeable battery, at least one wireless chip set for sending and receiving data over a local wireless network; and, an interactive display screen for displaying information to a card operator.

In one embodiment, the EMV chip and the NFC chip include on-board memory for storing at least payment card data of one or more than one accounts owned by the card operator. In one embodiment, the display screen is an interactive touch screen supporting scroll and content select actions performed by the card operator.

In another embodiment of the invention, the computerized transaction card further includes a subscriber identity module (SIM) including an international mobile subscriber identity (IMSI) number and a related key for authenticating the card operator over a telephony network. In another embodiment, the computerized transaction card further includes a wireless fidelity (Wi-Fi) chip set for sending and receiving data over a Wi-Fi network.

In one embodiment, the display screen is an organic light emitting diode (OLED) screen. In another embodiment, the interactive display screen is a liquid crystal display (LCD) screen associated with a command button for scrolling and selection of displayed content.

According to one aspect of the invention, a method is provided for proxy acquisition of card account data to present at a POS terminal adapted to read magnetic stripes and EMV chips using a smart card, the smart card having a plastic form factor supporting all or a combination of a magnetic stripe, a euro-pay master card and visa (EMV) chip, and a near field communication (NFC) chip, a micro-controller powered by a rechargeable battery, a wireless chip set for sending and receiving data over a local wireless network, and an interactive display screen for displaying information to a card operator, the method including the steps (a) using scroll and select input mechanisms, select a desired payment card option from more than one such option identified on the smart card, (b) send the payment card option selected in (a) to a smart phone having wireless connection to the smart card, (c) from the smart phone, connect to a cloud server hosting at least one or more card accounts forwarding the selected payment option to the cloud service, (d) from the cloud server, authenticate the user account access authority and retrieve a set of card data matching the request data received at the server on behalf of the user, (e) from the cloud server, send the set of card data retrieved in (d) to the requesting smart phone, and (f) from the smart phone, send the set of card data to the smart card.

In one aspect of the method, the EMV chip and the NFC chip include on-board memory for storing at least payment card data of one or more than one accounts owned by the card operator. In one aspect, in (a), the input mechanisms for scroll and select are touch screen operations. In one aspect, in (b), the wireless connection is a Bluetooth™ connection or a wireless fidelity (Wi-Fi) connection. In one aspect, in (c), the cloud hosted service is a digital wallet service hosted on the Internet.

DETAILED DESCRIPTION OF THE INVENTION

In various embodiments described in enabling detail herein, the inventor provides a unique hybrid computerized mobile transaction card that may be used as a single interface in a transaction network. The present invention is described using the following examples, which may describe more than one relevant embodiment falling within the scope of the invention.

It is a goal of the invention to provide smart card that is adapted to function as a static contact smart card with access to a cloud-based digital wallet account and to function as a dynamic contact-less smart card. It is a further goal of the invention that the hybrid smart card function as an automated clearing house ACH or bank-issued debit card. It is a further goal that the smart card provide a mobile wallet interaction capability including the ability of the user to select other payment cards from a network-hosted cloud wallet account to use for merchant transactions involving magstripe or EMV chip.

Figure 1:
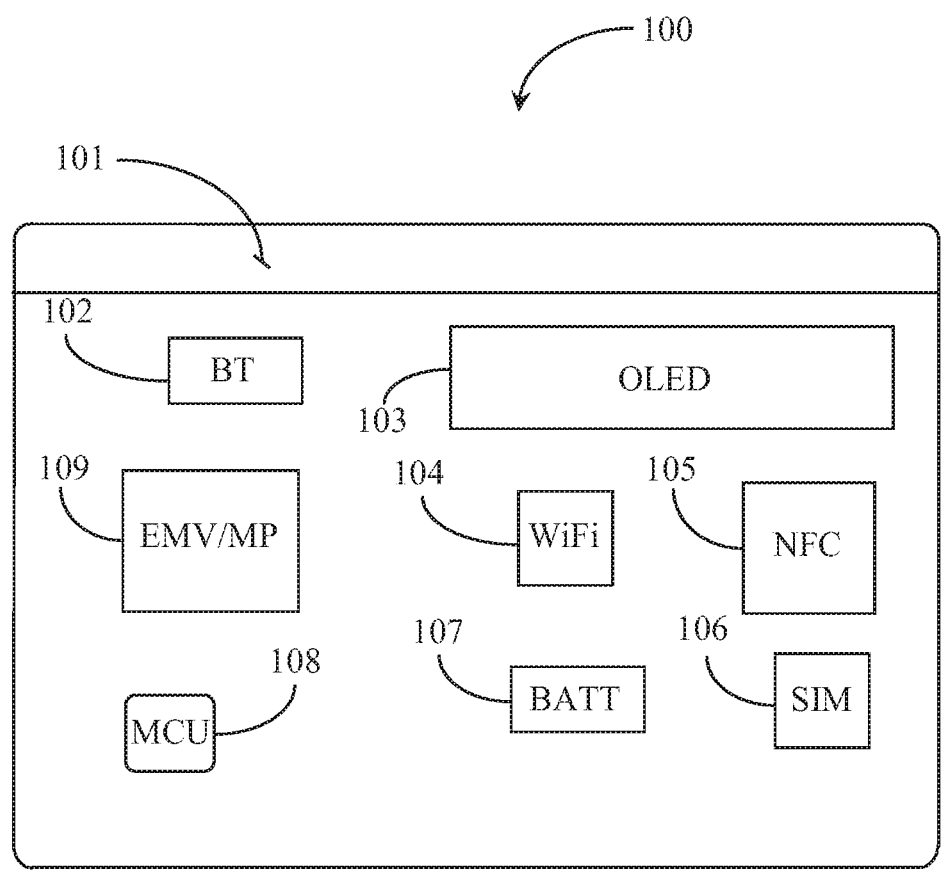
FIG. 1 is a block diagram depicting a smart card and featured components thereof according to an embodiment of the present invention.

FIG. 1 is a block diagram depicting a smart card 100 and featured components thereof according to an embodiment of the present invention. Smart card 100 is adapted as a form factor debit card having computerized circuitry powered by a rechargeable battery (BATT) 107. Battery 107 may be a rechargeable battery supplying power to card circuitry including a micro controller unit (MCU) 108.

Smart card 100 includes, among other contact components, a magnetic stripe 101 for contact swiping and reading by magnetic reader at a point of sale (POS) terminal. Smart card 100 may be identified or appropriated by a standard 16-digit debit card number like a Visa debit card for example. In an alternative embodiment, smart card 100 may be a credit card product without departing from the spirit and scope of the present invention.

Smart card 100 includes a euro pay master card and visa (EMV) integrated circuit (IC) chip with a micro-processor (MP) 109. EMV chip 109 may be powered by battery 107 and is another form of contact paying at a POS terminal. Smart card 100 is adapted, in this embodiment, to enable a user to elect other payment cards through connectivity to a network cloud where additional user payment cards may be stored.

Smart card 100 includes a near field communications (NFC) chip 105. In this embodiment, NFC chip 105 incorporates a secure element meaning that the data is encrypted and the transfer from one device to another device is short range wherein the devices don't have to touch one another. NFC chip 105 may be used as a non-static contact-less interface in a POS equipped for NFC. A user may store multiple payment card data sets, crypt o-currency data, or any token currency directly on the NFC chip 105. Smart card 100 enables a user to pay at a POS terminal using NFC when available at the terminal in a manner that seeks to avoid the double interchange fees that may be charged the merchant's when a user links a debit card purchase to a credit card account to fund POS transactions in real time. Smart card 100 includes a Bluetooth™ module 102 enabling smart card 100 to pass information and receive information from another Bluetooth™ enabled device like a user's smart phone.

Smart card 100 includes an organic light electroluminescent diode (OLED) 103. OLED 103 may be an interactive screen used to order data and to display data. Other screen technologies like E-ink, LCD, and others may be used as screen 103 where input may be registered through touch (touch screen), or by a connected scroll button or other interactive mechanism. A user may order and view payment card data and images.

In one embodiment, smart card 100 includes a wireless fidelity (Wi-Fi) module 104 enabling card 100 to access the Internet. In one embodiment, card 100 includes a subscriber identity module (SIM) 106 enabling smart card 100 to store the user's international mobile subscriber identity (IMSI) and a related key for authentication over a telephony network. SIM card 106 has a unique serial number. SIM offers the user certain password protected (PIN, PUC) services and memory space for storing critical information including passwords, contacts, and local network information.

Smart card 100 is adapted for NFC without functioning as a proxy wherein the card data selected from more than one data set on the card is fully loaded onto the card and can be wholly presented by the card interacting directly with a contact-less NFC reader at a POS terminal. Smart card 100 may also be programmed to function as a proxy broker between the user and the user's network-hosted wallet account service. In a preferred embodiment, smart card 100 is a debit card, but may also be provided as a credit card without departing from the spirit and scope of the present invention.

Figure 2:
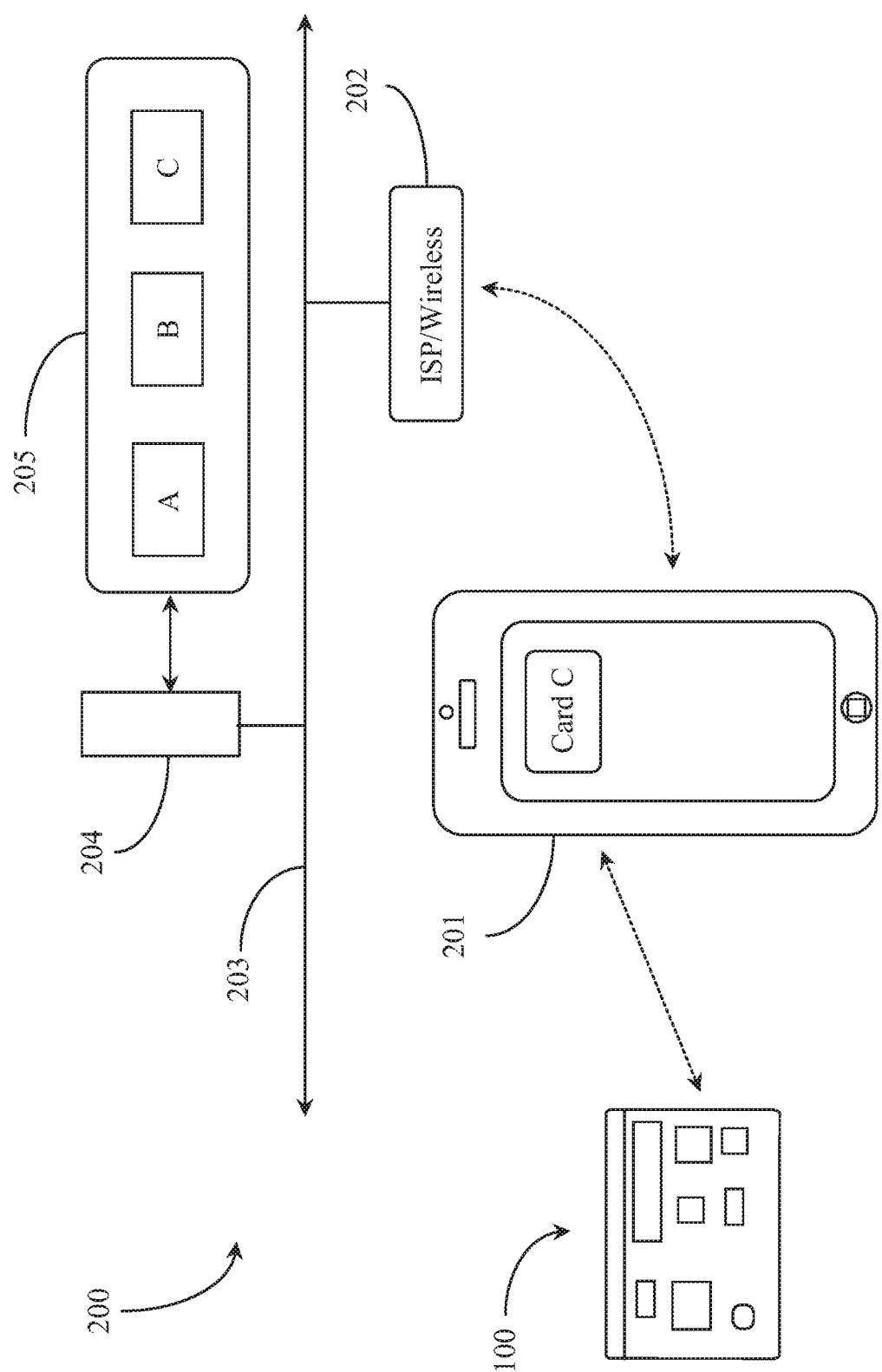
FIG. 2 is an architectural diagram of a communications network supporting the hybrid smart card of FIG. 1.

FIG. 2 is an architectural diagram of a communications network 200 supporting hybrid smart card 100 of FIG. 1. Network 200 includes a network backbone 203. Network backbone 203 may represent an Internet network, a wide area network (WAN) or a local area network (LAN), without departing from the spirit and scope of the present invention.

Smart Card 100 communicates directly with a user's smart phone 201 over a wireless network (broken double arrow) like Bluetooth™.

Smart phone 201 has a wireless Internet connection through an Internet service provider (ISP) 202. Smart phone 201 has network connection to a cloud data server 204 hosted on network backbone 203. Cloud server 204 has connection to a data repository 205 representing client data relative to a cloud wallet account service the user operating smart phone 201 has a subscription to. User account data in repository 205 includes a data set A, a data set B, and a data set C. Each data set represents a user card account maintained by the wallet service on behalf of the user.

In general sequence of events, a user operating smart phone 201 and in possession of card 100 approaches a POS terminal adapted for magnetic stripe and EMV chip contact events. A user may select the payment card account that the user desires to debit for one or more transactions performed at the POS terminal. The user may select from several options stored on card 100 and accessible via user interaction with the touch screen on the card. In one embodiment, a control button or indicia may be provided to display data and select data.

Smart card 100 sends a message or notification request to smart phone 100 via Bluetooth™ or any other viable wireless protocol. The message includes at least the identification data confirming the card data set the user wishes to debit for one or more purchases. An application running on the user's smart phone connects to and communicates the message (forward) to cloud server 204 hosting the user's cloud wallet account. In this embodiment, the user chose card account data C from more than one option on card 100. Server 204 authenticates the user and retrieves the complete functional card data for user card C and passes that to smart phone 201 as Card C displayed on smart phone 201.

Smart phone 201 then passes complete card data set to smart card 100 via Bluetooth™. The user has a card C ready for use in a contact swipe of card 100 through a magstripe reader or for use in a contact EMV chip reader slot. In the transaction sequence, the merchant debits Card account C though the provisioned card number of smart card 100 when not used with the user's cloud wallet account may be tied to a user's automatic clearing house (ACH) account or bank account tied to the issued number, which may be a typical 16 digit number.

Figure 3:
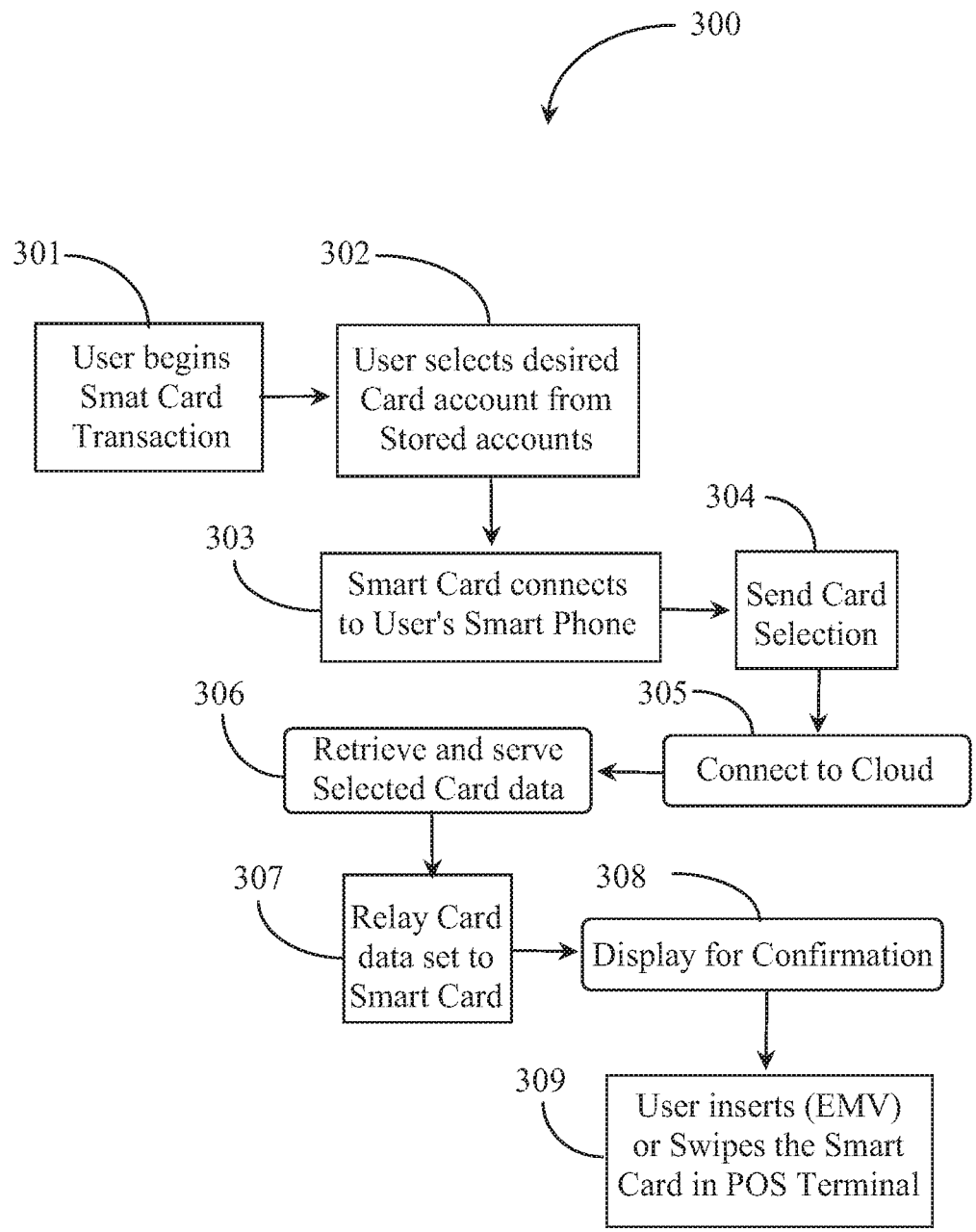
FIG. 3 is a process flow chart depicting steps for using the smart card of FIG. 1 as a proxy transaction card.

FIG. 3 is a process flow chart 300 depicting steps for using the smart card of FIG. 1 as a proxy transaction card. The process may begin at step 301 when a user determines to make a POS transaction using the smart card of the present invention. In step 302, the user may select a desired card to use from a display screen on the smart card. In step 303, the smart card recognizes the user's wireless paired smart phone, and sends a message containing the identification at least of the card the user wishes to use in the POS transaction at step 304.

At step 305, the user's smart phone establishes an Internet connection with a cloud server hosting the user's wallet account over Wi-Fi, 5G, or other wireless protocol. The cloud server authenticates the user and retrieves the correct card data and sends that data set to the smart phone in step 306. At step 307, the user's smart phone may send the downloaded card data set to the smart card. In step 308, the correct card (user selected) may be displayed in the display screen on the smart card. At step 309, the user may swipe the smart card through a magnetic reader or insert the smart card into an EMV reader slot.

Figure 4:
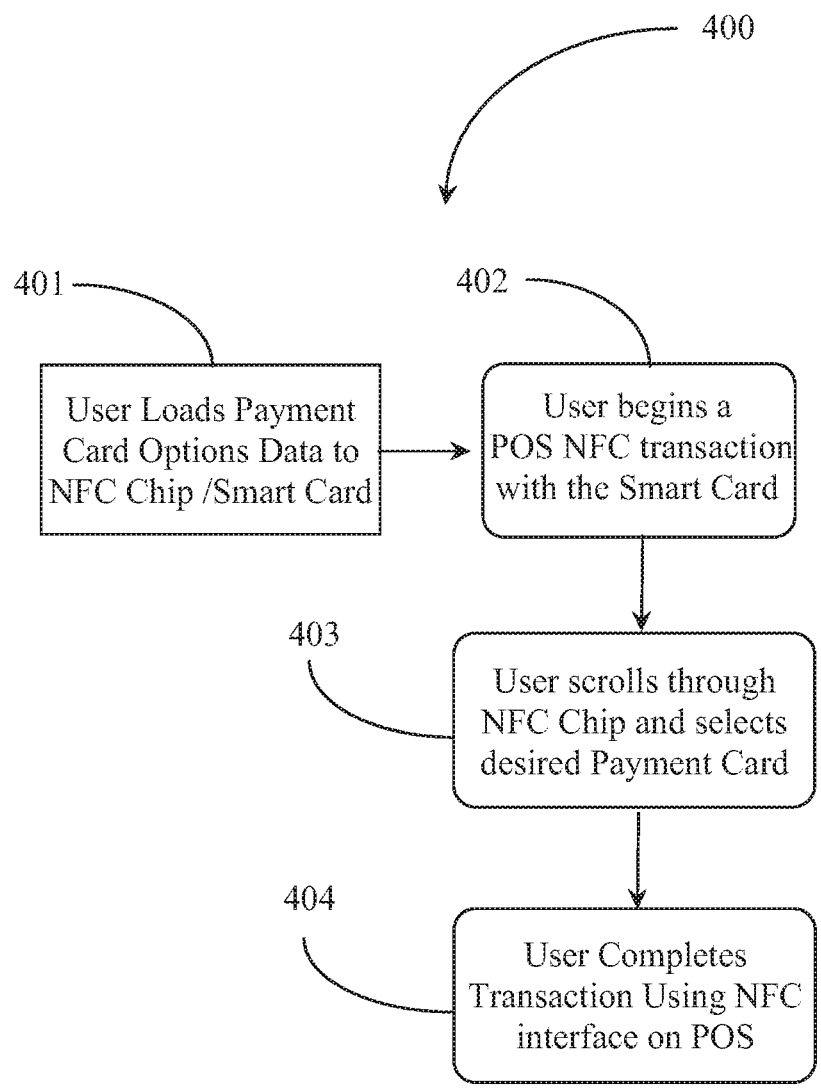
FIG. 4 is a process flow chart depicting steps for using the smart card of FIG. 1 as a universal card at an NFC interface.

FIG. 4 is a process flow chart 400 depicting steps for using the smart card of FIG. 1 as a universal card at an NFC interface. The dynamic NFC chip (Secure Element) aboard the smartcard allows the user to store multiple payment cards directly on the smart card NFC chip (secure element) to use in an NFC based POS transaction.

At step 401, the user may begin a POS transaction. At step 403, the user may scroll through card options from the display screen on the smart card and may select a desired payment card from the listed options loaded onto the NFC chip memory. Once a selection is made, the user may use the smart card of the present invention through the NFC interface at the POS terminal at step 404 and the merchant debits the account selected by the user.

It will be apparent with skill in the art that the smart card of the present invention may be provided using some or all the elements described herein. The arrangement of elements and functionality thereof relative to the smart card of the invention is described in different embodiments each of which is an implementation of the present invention. While the uses and methods are described in enabling detail herein, it is to be noted that many alterations could be made in the details of the construction and the arrangement of the elements without departing from the spirit and scope of this invention. The present invention is limited only by the breadth of the claims below.

The invention claimed is:

1. A method for proxy acquisition of payment card account data to present at a POS terminal adapted to read magnetic stripes and EMV chips using a smart card, the smart card having a plastic form factor supporting any one or more of a magnetic stripe, a euro-pay master card and visa (EMV) chip, and a near field communication (NFC) chip, a micro-controller powered by a rechargeable battery, a wireless chip set for sending and receiving data over a local wireless network, and an interactive display screen for displaying information to a card user, the method including the steps of:

(a) selecting a desired payment card option from more than one such option identified on the smart card;

(b) sending the payment card option selected in (a) to the card user's smart phone having wireless connection to the smart card;

(c) from the smart phone, connecting to a cloud server hosting at least one or more payment card accounts, forwarding the selected payment card option to the cloud service;

(d) from the cloud server, authenticating the user account access authority and retrieving a set of card data matching selected payment card option received at the server on behalf of the user;

(e) from the cloud server, sending the set of card data retrieved in (d) to the smart phone; and (f) from the smart phone, sending the set of card data to the smart card.

2. The method of claim 1, wherein the EMV chip and the NFC chip include on-board memory for storing at least payment card data of one or more than one accounts owned by the card operator.

3. The method of claim 1, wherein in (a), input mechanisms are utilized for scroll and select and are touch screen operations.

4. The method of claim 1, wherein in (b), the wireless connection is a Bluetooth™ connection or a wireless fidelity (Wi-Fi) connection.

5. The method of claim 1, wherein in (c), the cloud hosted service is a digital wallet service hosted on the Internet.

\* \* \* \* \*